United States Patent [19]

Huber

[11] Patent Number: 4,648,246

[45] Date of Patent: Mar. 10, 1987

[54] ARRANGEMENT FOR DETERMINING THE DIFFERENCE BETWEEN DIFFERING AND CHANGING TEMPERATURES FOR ACTIVATING A CONTROL, REGULATING, MEASURING OR RECORDING PROCESS AND THE APPLICATION OF THE ARRANGEMENT IN A HEAT COUNTER

[76] Inventor: Jakob Huber, Les Aveneyres 8, 1806 St.-Legier, Switzerland

[21] Appl. No.: 689,327

[22] Filed: Jan. 7, 1985

[30] Foreign Application Priority Data

Jan. 13, 1984 [CH] Switzerland ............................ 397/84

[51] Int. Cl.$^4$ ................................................ F03D 5/00
[52] U.S. Cl. .................................... 60/530; 236/99 E; 337/308; 374/113
[58] Field of Search ................ 60/530, 531; 236/99 E; 374/112, 113; 337/307, 308

[56] References Cited

U.S. PATENT DOCUMENTS

| 1,988,776 | 1/1935 | Berghoefer | 236/99 E |
| 1,994,983 | 3/1935 | Florez et al. | 236/99 E |
| 2,474,369 | 6/1949 | Ray | 337/307 X |

Primary Examiner—Stephen F. Husar
Attorney, Agent, or Firm—Burns, Doane, Swecker & Mathis

[57] ABSTRACT

The interior of two metallic bellows is in fluid connection through capillary tubes with temperature sensors. The temperature sensors are located in places whose relative temperature difference should be determined. In the presence of a temperature difference two springs, each fixed between one of the two metallic bellows and a reference indicator, are pressed together whereby the reference indicator is displaced from its neutral position. The magnitude of this displacement is a measure of the temperature difference and is used by means of switching or recording mechanisms to activate a measuring, controlling, regulating or recording process.

6 Claims, 6 Drawing Figures

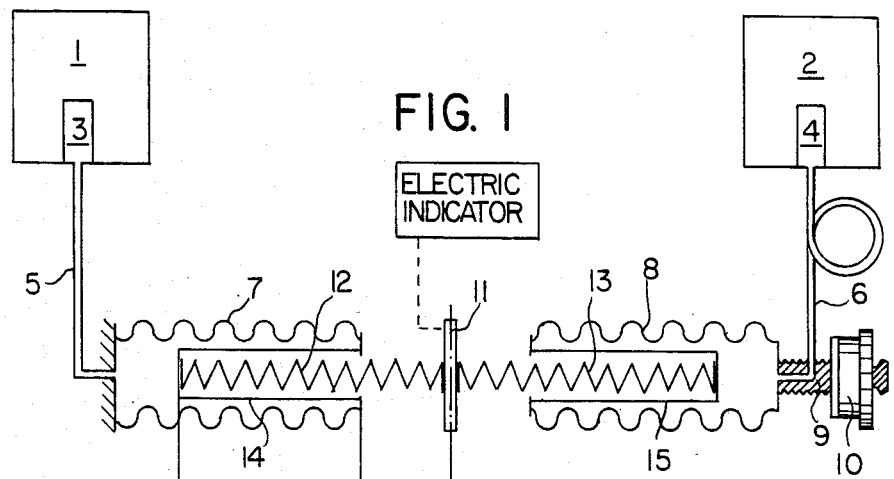
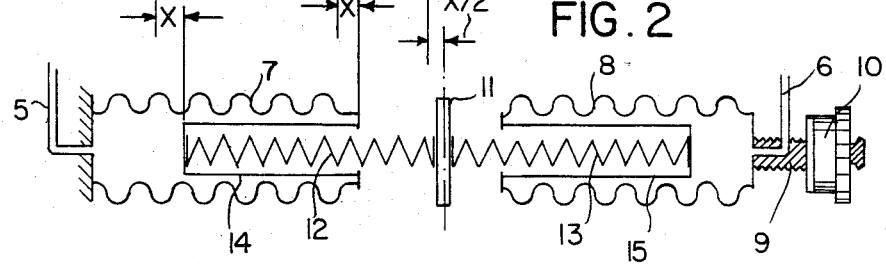
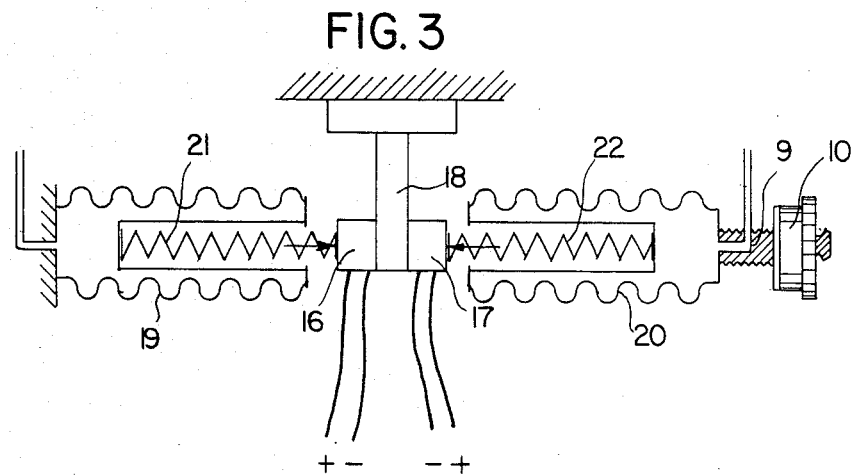

ARRANGEMENT FOR DETERMINING THE DIFFERENCE BETWEEN DIFFERING AND CHANGING TEMPERATURES FOR ACTIVATING A CONTROL, REGULATING, MEASURING OR RECORDING PROCESS AND THE APPLICATION OF THE ARRANGEMENT IN A HEAT COUNTER

The present invention relates to an apparatus for determining temperature differences between two locations, and more particularly to arrangements for operating regulating and control devices in response to temperature changes.

The apparatus of the present invention may be used to determine the differential temperature between two separate rooms which are thermally insulated from each other in order to carry out a control, regulating, measuring or recording process. The apparatus can also be used for determining such temperature differences for spatially separated solid, gaseous, and liquid bodies in order to control, regulate or record a process.

For example, the apparatus can be used in the natural cooling of cellars for the purpose of storing wine and foodstuffs, for example, in which during warm periods the apparatus operates to open cellar windows or some other opening intended for this purpose at night in order to let the considerably cooler night air flow into the cellar and, during the day, as soon as the external air temperature is above the air temperature in the cellar the apparatus operates to close the cellar windows closed. The exchange effect during the night may be augmented by a ventilator, which is switched on or off by the arrangement depending on which temperature is higher and whereby at the same time a flap in the intake channel and in an outlet opening is opened or closed. Such a method of cooling supplies is advantageous from the point of view of both initial investment costs and continuing costs. The application of this apparatus in a heat counter, for example, in a central heating installation or cooling system has the advantage of eliminating the need for an expensive electronic system which is susceptible to breakdown, and has high maintenance costs.

SUMMARY OF THE INVENTION

The present invention provides an apparatus for measuring differential temperatures between two different locations in order to operate regulating and control devices in response to the differential temperature. A bellows is operated by an expansion fluid in communication with the locations between which the differential temperature is to be measured. The position of the bellows is set by the differential temperature, thus providing an indication of the actual temperature differential without the need for electronic devices.

BRIEF DESCRIPTION OF THE DRAWINGS

Preferred embodiments of the present invention will be described below. The features and advantages of the present invention will become clear from the detailed description below when read in conjunction with the accompanying drawings, in which:

FIGS. 1 and 2 are schematic diagrams illustrating a first embodiment of the present invention;

FIG. 3 illustrates a second embodiment of the present invention;

In FIG. 1 the two rooms, whose temperature difference is to be determined, are indicated by 1 and 2. In each of the rooms there is a temperature sensor 3 and 4, whose expansion fluid communicates through flexible capillary tubes 5 and 6 each with a closed metallic bellows 7 and 8.

Figure 4:
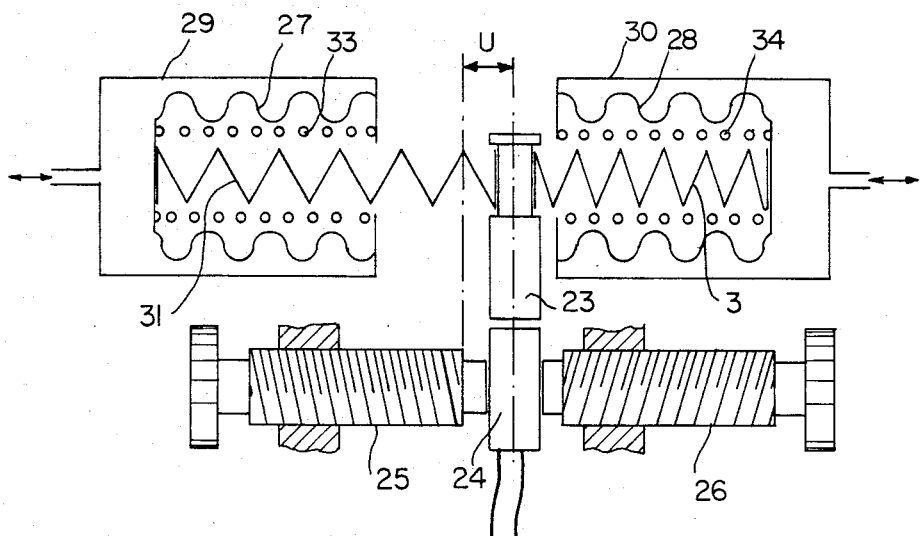
FIG. 4 illustrates a third embodiment of the present invention.

The left metallic bellows 7 is permanently fixed on one side, whereas the right metallic bellows 8 has a threaded spindle 9 onto which can be screwed a knurled nut 10 which is fixed in an axial direction and which is used for the fine adjustment of the neutral position of a reference indicator 11. The latter is held in a central position by two helical springs 12, 13 supported at their outer ends by the bases of tubular pistons 14, 15. The pistons 14, 15 form the inner boundary of the metallic bellows 7 and 8 and at the same time a guide bearing for the springs 12 and 13.

In FIG. 1 the reference indicator 11 is located exactly in the middle between the two metallic bellows, which is the case, when the temperatures in the two rooms 1 and 2 are equal. In the configuration according to FIG. 2 the temperature in the left room 1 is higher than in the right room, so that when compared with the neutral position of FIG. 1, the metallic bellows 7 has extended itself by a distance X, against the resistance of the two springs 12 and 13, the metallic bellows 8 and of course the liquid in the latter as well as in the tube 6 and in the temperature sensor 4. The free end of the metallic bellows 8 or some point of the piston 14 assumed fixed, for example, its base can be taken as the fixed point for the displacement X.

Since the two springs 12 and 13 of equal length are in a row, the displacement of the reference indicator 11 is half that of the base of the piston 14, namely X/2.

This displacement can be utilized in various ways, preferably electrically, but also mechanically for controlling or regulating a process dependent upon the temperature difference between the two rooms 1 and 2, such as for the natural cooling of storage cellars as mentioned in the introduction.

In the simplest case the displacement X/2 of the reference indicator will be used for opening and closing electrical contacts.

FIG. 3 shows an illustrative arrangement of a type in which the control or regulating impulse is activated by two piezoquartz crystals 16, 17, which are mounted on a fixed supporting plate 18 and which in the presence of different temperatures in the two rooms 1 and 2 are unequally loaded by the two metallic bellows 19, 20 via the springs 21 and 22. Accordingly voltages of two different magnitudes occur in the two piezoquartz crystals whose difference and/or sum can be used in a well-known manner to generate a control voltage in order to activate the processes described below.

For this arrangement instead of piezoquartz crystals electrical resistance elements could also be used, which contain a large number of small graphite spheres embedded in an elastic matrix, and which with increasing pressure are pressed together more strongly whereby their electrical resistance decreases due to the increase in the electrically conducting cross section. As a result the difference and/or sum of the electrical resistances of these elements is also a measure for the temperature differences to be measured between the two rooms 1 and 2 or between two locations in one or two solid bodies or in gaseous or liquid media.

With this arrangement the supporting plate 18 is also adjustable, in order to have, in addition to the setting mechanism consisting of the threaded spindle 9 and the knurled nut 10, further possibility of adjustment.

In the arrangement of FIG. 4 the reference indicator 23 is made of iron. The activation of a control procedure or a regulating signal results by means of a non-contact proximity switch 24 of well-known design, whose position in reference to the neutral position of the reference indicator 23 can be adjusted by two adjusting screws 25, 26 for the purpose of presetting a certain temperature difference at which a control or regulating procedure should take place. As soon as the reference indicator 23 during the presence of this temperature difference is displaced from its neutral position by a distance u and thereby reaches the region of the proximity switch 24, it activates the control or regulating process. The proximity switch can also be replaced by a mechanically activated switch.

The metallic bellows 27 and 28 differ from those in FIGS. 1-3 by the fact that they are located within a cylindrical housing 29 and 30 and the metallic bellows function as pistons which displace springs 31 and 32. Located within each of the metallic bellows 27 and 28 is a compensating spring 33 and 34 which should cancel the hysteresis of the metal of the metallic bellows in order to eliminate measurement inaccuracies.

Figure 5:
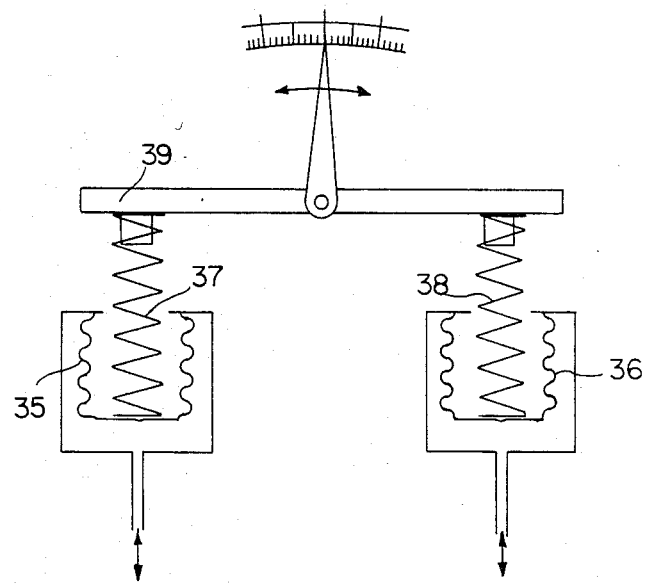
FIG. 5 illustrates a fourth embodiment of the present invention.

FIG. 5 shows a schematic diagram of an arrangement in which the movement of the metallic bellows 35, 36 is translated into the arcing motion of a balance lever with equal arms 39 by means of springs 37, 38. This arcing motion can in a well-known way, as described previously, be used to activate a switch, or as evident from FIG. 5, be indicated on a scale.

It must be emphasized that the arrangements described, just as all other conceivable variations thereof, serve only to determine temperature differences, whereby the magnitude of the individual temperature themselves are irrelevant.

The application of the arrangement is not limited to the uses described initially. Due to the movable parts of the arrangement, such as pistons, metallic bellows, springs, reference indicator, lever, etc. other activating mechanisms of switches or relays can be developed to limit or indicate, for example, end positions or extreme values in appropriate applications.

Figure 6:
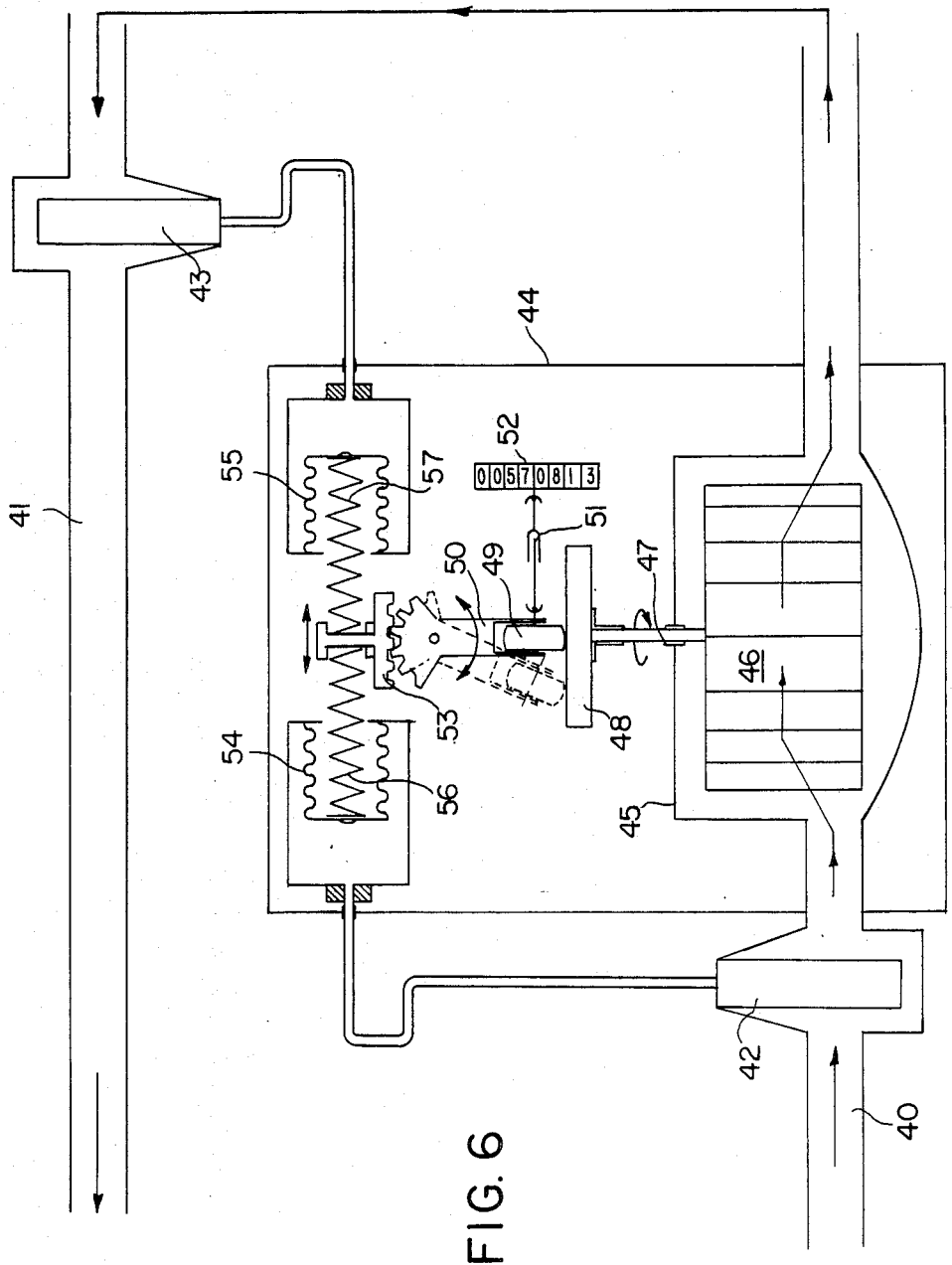
FIG. 6 illustrates the present invention in use as a heat counter for a central heating or cooling installation.

A particularly suitable application of such an arrangement is shown schematically in FIG. 6. It deals with a heat counter for recording the heat consumed in a central heating installation. The feed pipe is indicated by 40 and the return pipe by 41. Temperature sensors 42 and 43 respectively are placed in each of the two pipes. The heat counter 44 has a water counter 48 whose rotor 46 is connected to a friction wheel 48 with a rubber coating by means of its shaft 47. The friction wheel 48 is in contact with a roller 49 which is housed in the fork of a rotating toothed segment 50 and which transmits the rotation from the friction wheel by way of a Cardan shaft 51 to a counter 52, which, for example, indicates the units of heat consumed. The toothed segment 50 meshes with a toothed rack 53 which converts the displacement caused by the metallic bellows 54, 55 and transmitted to it by the springs 56, 57 into an arcing motion of the toothed segment 50 and thereby into a displacement of the point of contact of the roller 49 on the friction wheel 48. Depending upon the temperature difference between the feed and the return the roller 49 is located at a smaller or larger contact radius on the friction wheel 48 with correspondingly smaller or larger rotation speed. At a temperature difference of zero between feed and return the point of contact of the roller is at the center of the friction wheel whereby the roller is stationary.

In order to regulate a heating system dependent upon the external temperature, one temperature sensor must be located outside the building and another in a room inside the building whereby stronger heating is triggered, in order to increase the feed temperature, when a certain temperature difference occurs.

What is claimed is:

1. An apparatus for producing an electric signal as a function of the difference between two variable temperatures by means of a temperature sensor with expansion fluid in two locations separated and thermally insulated from each other in order to activate a control, regulating, measuring or recording process dependent upon a determinable temperature difference between said locations, whereby the determined temperature difference is independent of the absolute magnitude of the ambient temperatures, said apparatus including two expansion systems each with a metallic bellows the interiors of which are in fluid connection through capillary tubes with a temperature sensor so that each of the metallic bellows is functionally connected directly or indirectly to one of the ends of a spring so that the other ends of these springs are supported on opposite sides of a reference element, said springs operating in opposition on said reference element, said reference element producing said electric signal in response to differential spring pressures, thereby to supply said electric signal for the control, regulating, measuring or recording process.

2. The apparatus of claim 1, wherein said reference element comprises a disk axially displaceable between said springs, and wherein on at least one of the two expansion systems is provided a threaded spindle onto which can be screwed a knurled nut fixed in the axial direction for the purpose of adjusting the neutral position of the disk.

3. The apparatus of claim 1, wherein the reference element is a fixed supporting plate on either side of which a loaded piezoquartz crystal is supported by one of the two springs.

4. The apparatus of claim 1 wherein said switching mechanism is a proximity switch which is activated by a reference indicator and wherein on each side of the proximity switch there is an adjusting screw for adjusting the position of the proximity switch.

5. The apparatus of claim 1, 2, 3 or 4 wherein the metallic bellows forms the inner boundary of the expansion system and wherein within the metallic bellows there is a compensating spring to compensate for the hysteresis of the material from which the metallic bellows is made.

6. The apparatus of claim 1, wherein the reference element comprises an adjustable supporting plate which is adjustable parallel to the axis of said springs and on either side of which a loaded piezoquartz crystal is supported by one of the two springs.

* * * * *